United States Patent [19]

Singleton

[11] Patent Number: 4,805,712

[45] Date of Patent: Feb. 21, 1989

[54] WHEELCHAIR

[75] Inventor: John M. Singleton, Solihull, England

[73] Assignee: The Spastics Society, London, England

[21] Appl. No.: 30,574

[22] Filed: Mar. 27, 1987

[30] Foreign Application Priority Data

Apr. 1, 1986 [GB] United Kingdom ............... 8607946
Jul. 5, 1986 [GB] United Kingdom ............... 8616434

[51] Int. Cl.$^4$ .................... B60L 11/18; B60K 1/00
[52] U.S. Cl. .................... 180/65.1; 180/907; 280/99; 280/250.1
[58] Field of Search ............ 180/65.1, 907, 908, 180/235, 326, 330, 233, 242, 247, 250, 332; 280/400, 103, 99, 91, 242 WC, DIG. 5, DIG. 10

[56] References Cited

U.S. PATENT DOCUMENTS

| | | | |
|---|---|---|---|
| 3,204,791 | 9/1965 | Williams | 180/65.1 |
| 3,213,957 | 10/1965 | Wrigley | 180/65.1 |
| 3,502,166 | 3/1970 | Christenson et al. | 180/55 |
| 3,901,337 | 8/1975 | Cragg | 180/907 |
| 4,089,384 | 5/1978 | Ehrenberg | 180/242 |
| 4,119,163 | 10/1978 | Ball | 180/907 |
| 4,455,031 | 6/1984 | Hosaka | 180/907 |
| 4,476,949 | 10/1984 | Patton | 180/907 |
| 4,512,613 | 4/1985 | Nassiri | 180/907 |
| 4,633,962 | 1/1987 | Cox et al. | 180/65.1 |

Primary Examiner—Richard A. Bertsch
Attorney, Agent, or Firm—Larson & Taylor

[57] ABSTRACT

A wheelchair having four ground engaging wheels, two at the front and two at the rear, and four electric motors, one for each wheel, wherein each wheel is connected to a respective electric motor for driving the wheelchair and the front wheels are mounted on respective steering arms of a steering linkage driven by an electric actuator coupled to a track rod connecting the steering arms for steering the wheelchair.

7 Claims, 5 Drawing Sheets ent of the steering arms.

WHEELCHAIR

BACKGROUND OF THE INVENTION

This invention relates to wheelchairs and in particular to electrically driven wheelchairs.

Electrically driven wheelchairs wherein either a pair of front wheels or a pair of rear wheels is electrically driven are well known.

For satisfactory operation it is necessary in such known wheelchairs to maintain the ground engaging contact of both driven wheels. As a result, while the known two wheel drive wheelchairs perform well on smooth surfaces, problems can arise on uneven surfaces such as encountered for "off the road" use, for example on grass.

Additionally, the known two wheel drive wheelchairs are not well suited to overcome obstacles of limited height such as kerb stones and this further restricts the use of the wheelchair.

SUMMARY OF THE INVENTION

The present invention is intended to remedy these drawbacks. It solves the problem of designing an electrically driven wheelchair capable of operation on uneven surfaces and negotiating obstacles of limited height by providing a respective electric motor for each of a pair of front wheels and each of a pair of rear wheels of the wheelchair.

The advantages offered by the invention are mainly that by providing drive to both the front and rear pairs of wheels there are sufficient driven wheels in ground engaging contact at any one time to drive the wheelchair on uneven surfaces and to overcome kerb stones and similar obstacles of limited height. Additionally, by providing a separate motor for each driven wheel, complicated drive transmissions connecting the driven wheels, such as belts or chains in which the user's hands or clothing may be trapped, are avoided.

Each driven wheel and associated motor are connected by respective drive transmitting means which is preferably disengageable to disconnect the drive so as to permit manual propulsion of the wheelchair if desired, for example following failure of one or more of the electric motors.

In a preferred construction each driven wheel is rotatably mounted on a spindle driven by the associated motor and the drive transmitting means comprises a coupling pin mounted on the wheel for engagement and disengagement with an aperture in a drive plate mounted on the spindle.

Preferably the coupling pin is resiliently biassed to engage in the aperture in the drive plate and has an operating member accessible to the user for manually disengaging the coupling pin to disconnect the drive.

Advantageously each driven wheel, associated motor and drive transmitting means are carried by a respective support plate which is mounted by a respective suspension unit providing limited resilient springing movement of the wheel.

Conveniently each suspension unit comprises a resilient bushing carrying a suspension pin to which the associated support plate is attached.

Advantageously one pair of driven wheels, either the front or rear, is steered. Conveniently the steered wheels are mounted on a steering linkage operable by an electric actuator.

Preferably the steering linkage comprises respective steering arms for mounting each wheel, the arms being mounted for rotation about substantially vertical axes and pivotally connected to opposed ends of a track rod driven by the actuator for effecting simultaneous adjustment of the steering arms.

Advantageously a manually operable control unit is provided to control selectively the drive and the steering. Conveniently the wheel motors and steering linkage actuator are connected to a power source comprising one or more batteries to which the control unit is connected for controlling the power output to the wheels and steering linkage.

The invention will now be described in more detail, by way of example only, with reference to the accompanying drawings.

DETAILED DESCRIPTION OF THE EXEMPLARY EMBODIMENT

Figure 1:
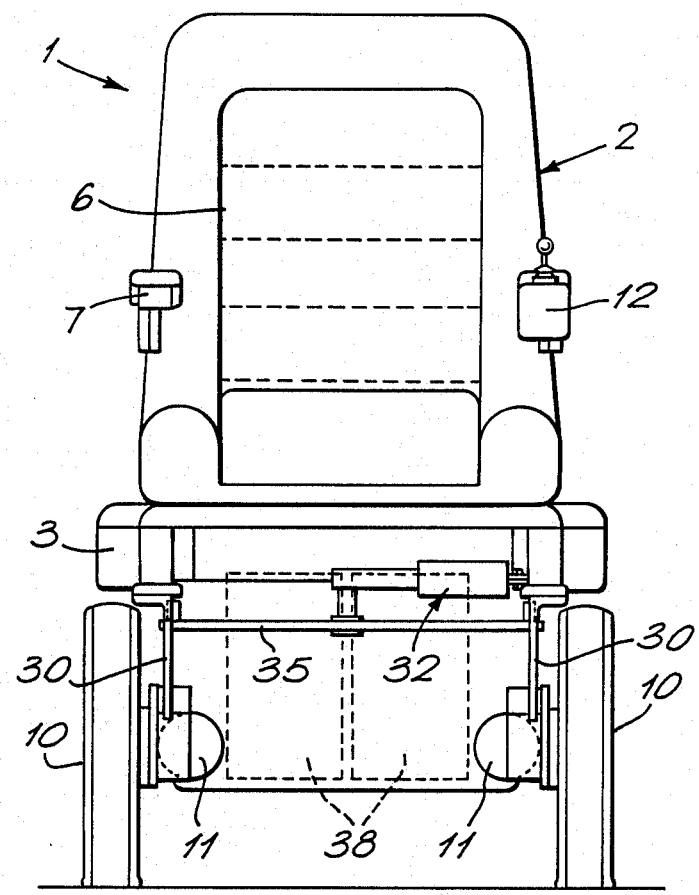
FIG. 1 is a front view of a wheelchair according to the present invention.
Figure 2:
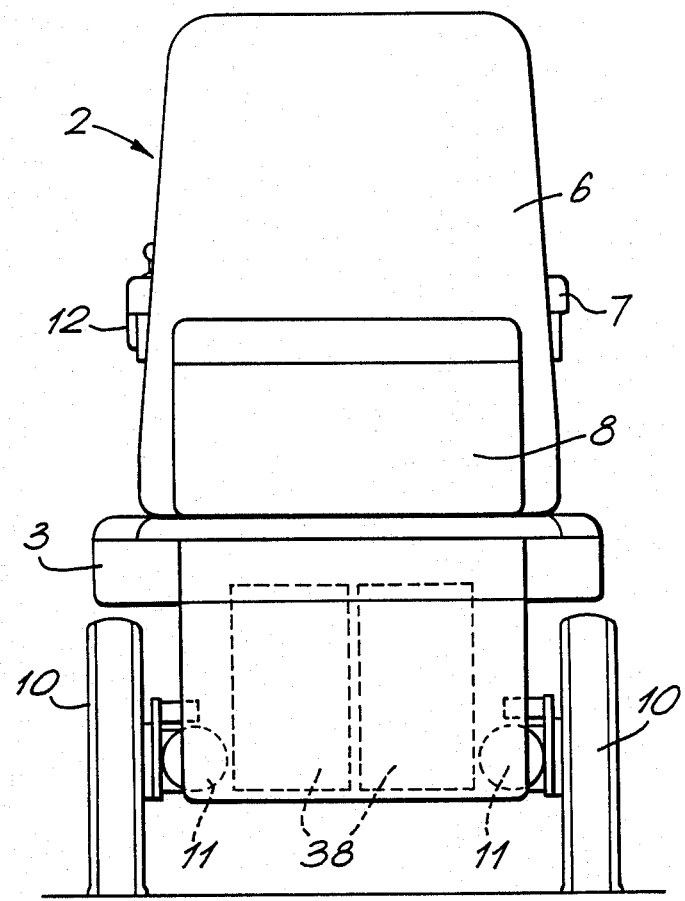
FIG. 2 is a rear view of the wheelchair shown in FIG. 1.
Figure 3:
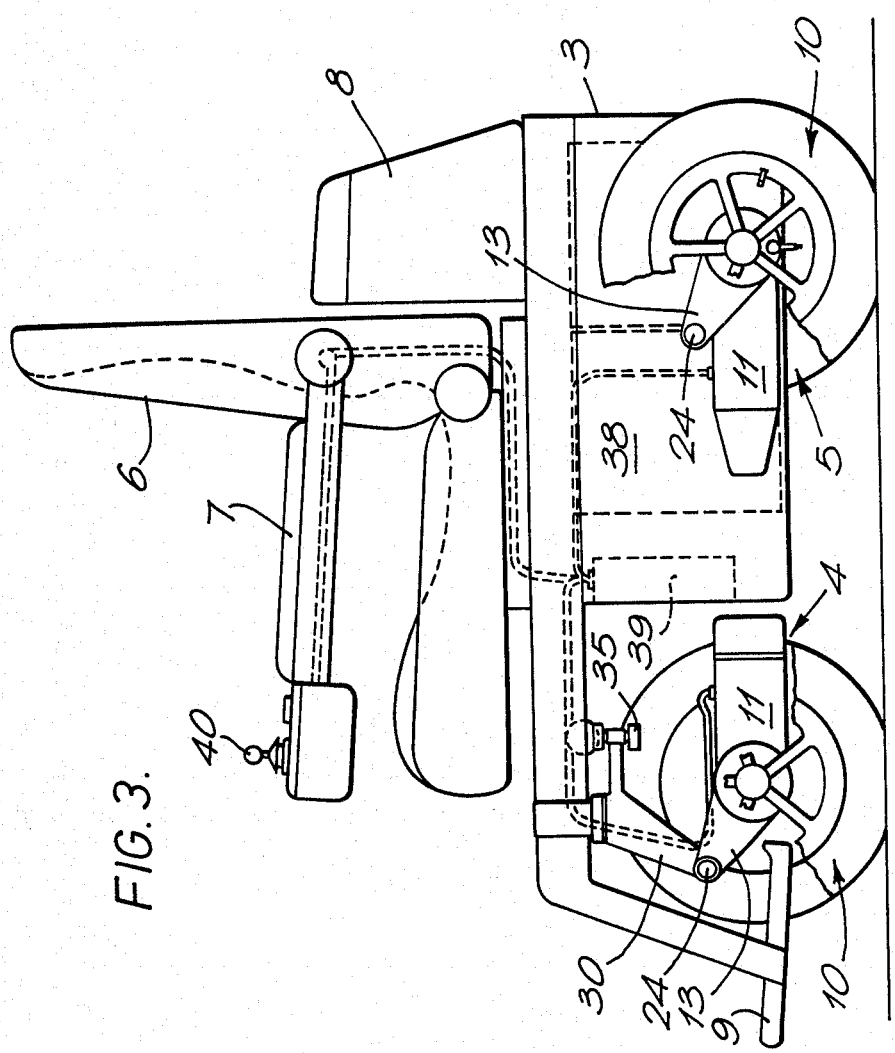
FIG. 3 is a side view of the wheelchair shown in FIGS. 1 and 2 with the wheels partially broken away for clarity.

Referring to the accompanying drawings, there is shown a wheelchair 1 comprising an upholstered seat unit 2 mounted on a chassis 3 supported on a pair of front wheel assemblies 4 and a pair of rear wheel assemblies 5.

The seat unit 2 includes a reclining backrest 6 carrying a pair of pivotal armrests 7 and is detachably secured by releasable fastening means (not shown) which also permit forward pivotal movement of the seat unit 2 for access to the chassis and associated components for maintenance purposes. Mounted on the chassis 3 behind the seat unit 2 is a parcel box 8 which is also detachably secured by releasable fastening means (not shown).

Mounted at the front of the chassis 3 between the front wheel assemblies 4 are two similar footrests 9 detachably secured by releasable fastening means (not shown) which also permit adjustment of the inclination of the footrests 9.

Each wheel assembly 4,5 is similar and includes a wheel 10 driven by an electric motor 11 as demanded by the user through a manually operable control unit 12 mounted on one of the armrests 7. Accordingly, the arrangement for one wheel assembly only will now be described, it being understood that the other wheel assembly arrangements are substantially the same.

Figure 5:
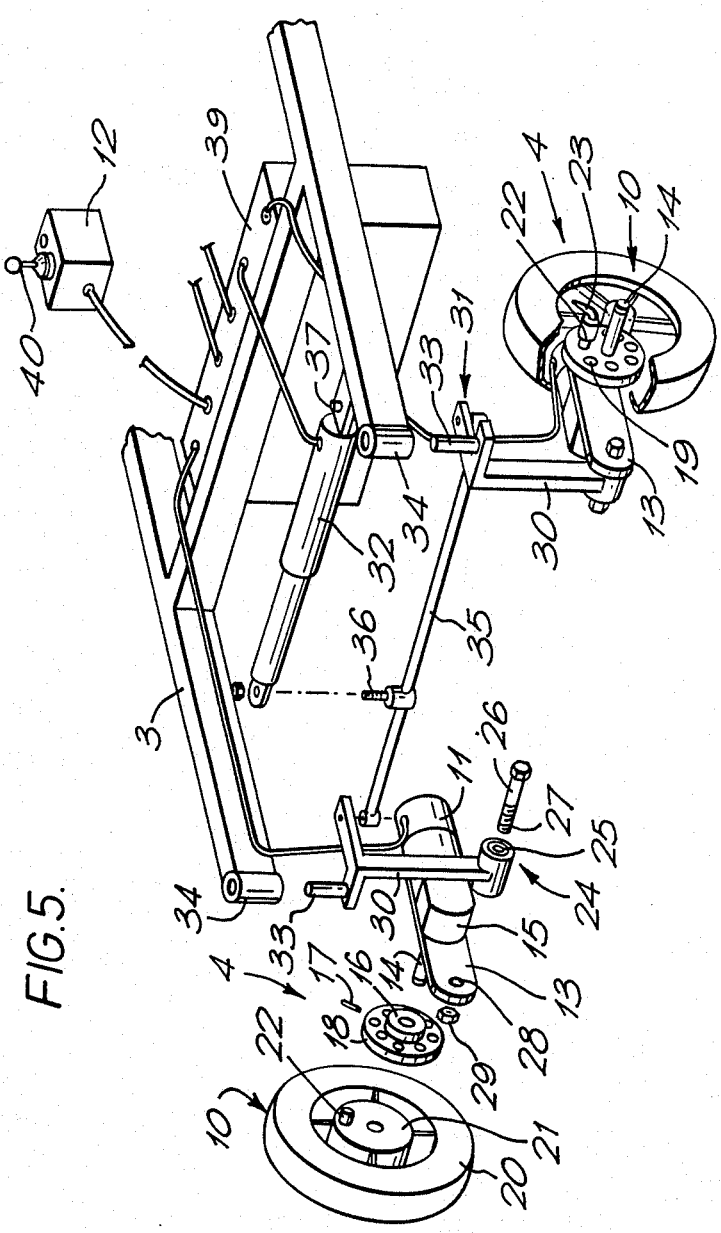
FIG. 5 is an exploded isometric view of the front wheel assemblies and the steering linkage.

As best shown in FIG. 5, the motor 11 is mounted on a support plate 13 and is connected to a spindle 14 through a reduction worm gearbox 15 to drive the spindle 14.

A drive plate 16 is fixedly mounted on the inboard portion of the spindle 14 by a retaining pin 17 and has an annular portion 18 in which a plurality of circumferentially spaced apart apertures 19 are formed.

The wheel 10 comprises a pneumatic tyre 20 mounted on a wheel rim 21 rotatably mounted on the outboard end of the spindle 14 and retained by a circlip (not shown) permitting removal of the wheel 10 when required.

For transmitting the drive from the spindle 14 to the wheel 10, the wheel 10 slidably mounts a coupling pin 22 extending parallel to the spindle 14 and resiliently biassed by a spring (not shown) to engage one end in one of the apertures 19 in the drive plate 16.

The other end of the coupling pin 22 carries a lever 23 accessible to the user by means of which the pin 22 can be moved axially against the resilient biassing to disengage the aperture 19 thereby disconnecting the drive to permit manual pushing of the wheelchair, for example by an attendant.

Each wheel assembly 4,5 is mounted by a respective suspension unit 24 providing limited independent resilient springing movement of the wheel 10 relative to the chassis 3.

Each suspension unit 24 is similar and comprises a rubber-bonded bushing 25 carrying a suspension pin 26 having a threaded end 27 extending through a hole 28 in the associated support plate 13 to which a nut 29 is attached to secure the suspension pin 26 and support plate 13 together against relative movement.

The rear wheel assemblies 5 are mounted by the associated suspension units 24 directly on the chassis 3 and the front wheel assemblies 4 are mounted by the associated suspension units 24 on respective arms 30 of a steering linkage 31 mounted on the chassis 3 and driven by an electric linear actuator 32, for example an electrically operated servo-motor, piston and cylinder ram device or the like, as demanded by the user through the control unit 12.

Each steering arm 30 has a swivel pin 33 intermediate the ends which is rotatably mounted in a respective sleeve 34 fixedly attached to the chassis 3 permitting rotation of the arm 30 about a substantially vertical axis.

The steering arms 30 are pivotally connected to opposed ends of a track rod 35 having a peg 36 at the mid-point to which one end of the linear actuator 32 is pivotally connected. The other end of the linear actuator 32 is pivotally connected to the chassis 3 by a hinge pin 37 whereby change in length of the linear actuator 32 displaces the track rod 35 effecting simultaneous steering adjustment of both front wheel assemblies 4.

Supported on the chassis 3 beneath the seat unit 2 are four twelve volt batteries 38 connected in series to a power amplifier unit 39 to which the control unit 12 is connected. The batteries 38 are of the rechargeable lead-acid type and provide a power output sufficient to give a range of travel of about 20 miles at speeds up to 4 miles per hour before requiring recharging.

The linear actuator 32 and each of the wheel motors 11 is independently connected to the power amplifier unit 39 and the control unit 12 has a manually operable joystick 40 movable forwards and backwards and to either side for controlling driving and steering of the wheelchair 1.

More specifically, forwards and backwards movement of the joystick 40 controls the power output to the wheel motors 11 for driving the wheelchair and sideways movement controls the power output to the linear actuator 32 for steering the wheelchair.

Figure 4:
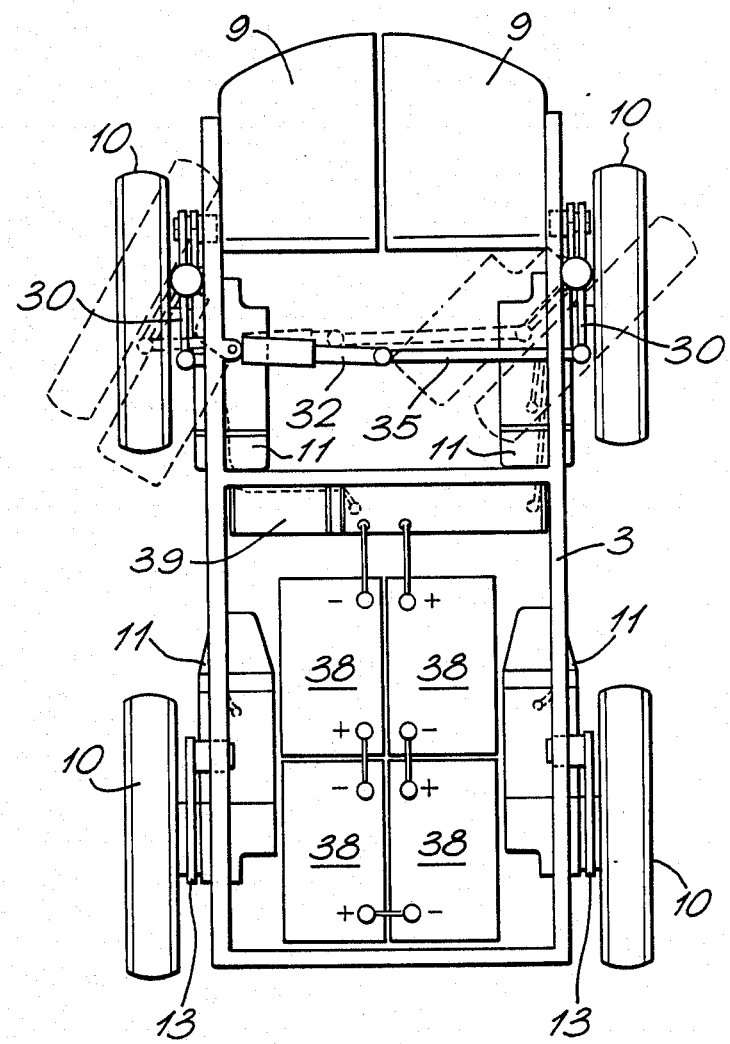
FIG. 4 is a plan view of the wheelchair shown in FIGS. 1 to 3 with the seat removed for clarity.

Thus starting from a central neutral or stop position in which there is no power output to the wheel motors 11 or the linear actuator 32, the steering linkage 31 is in the position shown in full lines in FIG. 4 and forwards or backwards movement of the joystick 40 provides a power output to each of the wheel motors 11 to drive the wheelchair forwards or backwards with the displacement of the joystick 40 from the neutral position being proportional to the power output for controlling the speed.

If the joystick 40 is moved sideways, a power output is provided to the linear actuator 32 for adjusting the length of the actuator to adjust the steering linkage 31 with movement to one side reducing the length of the actuator 31 to turn both front wheels 10 to one side as shown in dotted lines in FIG. 4 and movement to the other side increasing the length of the linear actuator 32 to turn both front wheels 10 to the other side.

The sideways movement of the joystick 40 may be combined with either forwards or backwards movement for simultaneous driving and steering.

As will be appreciated from the foregoing description, a four wheel drive wheelchair is provided in which each driven wheel is independently resiliently mounted and the front wheels are steered. By such construction there results a wheelchair which can be driven over uneven surfaces, can negotiate obstacles of limited height, for example climb and descend kerb stones, is comfortable and is highly manoeuvrable.

It will be understood that the invention covers all constructions of wheelchair in which there are a pair of front wheels and a pair of rear wheels each driven by a respective electric motor and that the above-described exemplary embodiment does not limit the scope of the invention as regards other features of the wheelchair which may be altered, changed or modified without departing from the invention.

For example, the drive connection between each wheel and the associated motor may be of any suitable type and may be releasable as described or fixed.

The steering linkage may be of any suitable construction and may mount the front wheels as described or the rear wheels.

Alternatively the steering linkage may be omitted and the wheelchair steered by using sideways movement of the joystick to drive one or more of the wheels at a different speed from the other wheels.

The construction of the seat unit and chassis may be altered as desired and the seat unit may be fixed or detachable.

I claim:

1. An electrically powered wheelchair having a pair of front wheel assemblies and a pair of rear wheel assemblies, each wheel assembly comprising a resiliently mounted support plate carrying a rotatable ground engaging driven wheel and an electric motor positioned inboard of said driven wheel and connected to said driven wheel by drive transmitting means, each said motor being operable by battery means through a manually operable control unit with each said drive transmitting means being manually releasable to disengage the drive to permit free rotation of the wheel, and a steering linkage mounting one of said pairs of wheel assemblies and operable by said battery means through said control unit, for steering said one pair of wheels.

2. A wheelchair according to claim 1 wherein each driven wheel is rotatably mounted on a spindle driven by said associated motor and said drive transmitting means comprises a coupling pin mounted on said wheel, means resiliently biassing said coupling pin to engage a selected one of a plurality of circumferentially spaced apart apertures in a drive plate mounted on the spindle and a lever accessible to the user outboard of said wheel and manually operable to move said coupling pin against said resilient biassing to disengage said aperture to disconnect the drive.

3. A wheelchair according to claim 1 wherein each steered wheel assembly is resiliently mounted on a respective steering arm of said steering linkage, said steering arms being mounted on opposed sides of the wheelchair for rotation about substantially vertical axes and being pivotally connected to opposed ends of a link, and an actuator operable by said battery means through said control unit to displace said link and rotate said arms simultaneously for steering said wheelchair.

4. A wheelchair according to claim 3 wherein said steered wheels are front wheels.

5. An electrically driven wheelchair comprising a chassis supported on first and second pairs of wheel assemblies, said first pair of wheel assemblies being resiliently mounted on respective arms of a steering linkage, said arms being mounted for rotation on respective side frame members of said chassis and pivotally connected to opposed ends of a link extending between said side frame members, an actuator operable by battery means through a manually operable control unit accessible to the user to displace said link and rotate said arms simultaneously for steering said wheel assemblies, said second pair of wheel assemblies being resiliently mounted on said side frame members, and each said wheel assembly comprising a support plate resiliently mounted by a suspension unit, a ground engaging driven wheel mounted for rotation on said support plate and an electric motor mounted on said support plate inboard of said wheel and connected to said wheel by drive transmitting means, each said motor being operable by said battery means through said control unit and each said drive transmitting means being manually releasable by a respective lever accessible to the user outboard of the associated wheel to disengage the drive to permit free rotation of the wheel for manual propulsion of the wheelchair.

6. A wheelchair according to claim 5 wherein each arm of said steering linkage is rotatable about a substantially vertical axis.

7. A wheelchair according to claim 5 wherein said first pair of wheel assemblies are arranged at the front of the wheelchair and said second pair of wheel assemblies are arranged at the rear of the wheelchair.

* * * * *